United States Patent [19]

Gencev et al.

[11] 4,416,862

[45] Nov. 22, 1983

[54] PROCESS FOR THE PREPARATION OF ALUMINIUM TRICHLORIDE AND SILICON DIOXIDE BY CHLORINATION OF ALUMINA WITH SILICON TETRACHLORIDE

[75] Inventors: Dinko Gencev, Sofia, Bulgaria; Katalin Szabo nee Mogyorosi, Tatabánya; Szilard Riederauer, Budapest; János Szépvölgyi, Tatabánya, all of Hungary

[73] Assignee: Tatabányai Szénbányák, Tatabanya, Hungary

[21] Appl. No.: 340,997

[22] Filed: Jan. 20, 1982

[30] Foreign Application Priority Data

Jan. 20, 1981 [HU] Hungary .................................. 116/81

[51] Int. Cl.$^3$ ................................................. C01F 7/56
[52] U.S. Cl. ..................................... 423/335; 423/135; 423/495
[58] Field of Search ............... 423/495, 335, 339, 126, 423/135

[56] References Cited

U.S. PATENT DOCUMENTS 4,086,320 4/1978 Martin et al. ................... 423/495 X
4,096,234 6/1978 Martin et al. ................... 423/495 X
4,220,629 9/1980 Wyndham et al. ............. 423/135 X

*Primary Examiner*—Jack Cooper
*Attorney, Agent, or Firm*—Gabriel P. Katona

[57] ABSTRACT

The invention relates to a method for utilizing silicon tetrachloride formed as a by-product of the chlorination of aluminium- and silicon-containing minerals. More particularly, the invention relates to a process for the preparation of aluminium trichloride and silicon dioxide by chlorination of alumina with silicon tetrachloride. According to the invention alumina or a material essentially consisting of alumina is reacted with silicon tetrachloride as a single chlorinating agent at a temperature exceeding 400° C., unreacted silicon tetrachloride is separated from the aluminium trichloride formed and is recycled into the chlorination step, silicon dioxide is isolated from the solid residue essentially consisting of the unreacted alumina and silicon dioxide, unreacted alumina is recycled into the chlorination step and aluminium trichlorine obtained is continuously eliminated.

6 Claims, No Drawings

PROCESS FOR THE PREPARATION OF ALUMINIUM TRICHLORIDE AND SILICON DIOXIDE BY CHLORINATION OF ALUMINA WITH SILICON TETRACHLORIDE

The invention relates to a method for utilizing silicon tetrachloride formed as a by-product of the chlorination of aluminium- and silicon-containing minerals. More particularly, the invention relates to a process for the preparation of aluminium trichloride and silicon dioxide by the chlorination of alumina, where silicon tetrachloride is used as the chlorinating agent.

It is well known that low-grade bauxites and other low-grade aluminium carriers, e.g. clays and bituminous shales contain in addition to aluminium a considerable amount of silicon. In some instances the quantity of silicon present may even exceed that of aluminium. It is further known that these minerals generally contain aluminium and silicon together, e.g. as aluminium silicates and therefore one has to face a considerable difficulty when trying to separate these elements. Though several attempts have been made to chlorinate aluminium selectively and separate the aluminium trichloride obtained, the formation of a considerable amount of silicon tetrachloride by-product can not be avoided. Thus a substantial amount of chlorine is consumed by the formation of silicon tetrachloride and consequently, this side-reaction considerably decreases the aluminium trichloride yield.

Up to the present no economic method has been found for utilizin silicon tetrachloride on an industrial scale.

The target of the present invention is to provide an economic process by which silicon tetrachloride produced as a by-product of chlorination of alumina and silicate-containing minerals or in any other way can be utilized to chlorinate alumina to produce aluminium trichloride.

The invention is based on the idea that the reaction of silicon tetrachloride with reactive concentrates enriched in alumina, which is preferably iron- and water-free, at a temperature exceeding 400° C., preferably between 700° C. and 1200° C. can be carried out with a very good yield of aluminium trichloride isolated, optionally after purification. The residue consisting of unreacted solid alumina and silicon dioxide precipitate can be released from silicon in a manner known per se by dissolving alumina and eliminating silicon dioxide by filtration. The dissolved alumina can be converted into alumina again and recycled into the first reaction step, while the unreacted silicon tetrachloride is also recycled.

The reaction of alumina and $Fe_2O_3$, respectively with silicon tetrachloride is known and proceeds acccording to the following equations:

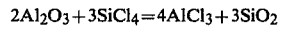

and

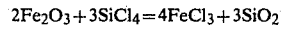

nevertheless, there has not been any method known in the art for the utilization of silicon tetrachloride alone, without any auxiliary chlorinating or reducing agent, for a total conversion of alumina into anhydrous aluminium trichloride in an economic process. In spite of the fact that the chlorination of iron oxide starts at a lower temperature than that of alumina, the selective chlorination of alumina cannot be achieved by working at suitably selected temperature the temperatures because at range range favourable for the chlorination of alumina the starting material still contains a considerable amount of iron oxide. Therefore, the basic material should preferably be iron-free. Otherwise the aluminium trichloride may be contaminated with iron chloride.

Our experiments showed that only alumina-reach reactive alumina concentrates, which have a negligible iron oxide content can economically be manufactured by the process according to the invention. Alum earth produced by the Bayer process or obtained after eliminating iron with an acidic treatment meets these requirements. Silicon tetrachloride can be used for the chlorination of alumina alone or with a carrier, e.g. nitrogen or carbon monoxide, in a heatable, vertical or horizontal pipe reactor, cyclon or fluid reactor. By a suitable reactor construction the detrimental effect of silicon dioxide formed during chlorination and precipitated on the surface of alumina particle can be eliminated or at least considerably reduced.

The reaction starts at about 400° C. but the conversion is increased if the temperature is raised. Therefore the reaction is preferably performed at a temperature of 700° C. to 1200° C. We have found that the efficiency of the chlorination depends on the quality of starting materials and the reaction conditions, it is therefore highly desirable to recycle the unreacted components until practically the total amount of alumina is converted into aluminium trichloride. Since silicon tetrachloride is transformed into silicon dioxide, the latter compound has to be separated from the unreacted alumina, as an undesirable by-product, which may precipitate on the surface of alumina particles thereby inhibiting the chlorination of unreacted alumina. Silicon dioxide is separated in a manner known per se. The solid residue poor in alumina and enriched in silicon dioxide is sulfatized with about a stoichiometric amount of concentrated sulfuric acid related to its alumina content, with stirring, at a temperature of 140° C. to 160° C. After eliminating the excess sulfuric acid, which distilles off at a temperature of 300° C. to 400° C. in the autothermic reaction the sulfate obtained as a fine powder which has lost its crystal water is dissolved in water and the insoluble silicon dioxide is filtered off. The aluminium sulfate solution is evaporated and subjected to thermal decomposition at about 850° C., whereupon sulfur trioxide formed is recycled into the sulfatization step in the form of sulfuric acid. Alumina obtained by thermal decomposition is recycled into the chlorination step. In this way alumina is kept in a cycle until its total amount is converted into aluminium trichloride.

Aluminium trichloride obtained is separated from the vapour mixture consisting of aluminium trichloride and unreacted silicon tetrachloride by condensation and the silicon tetrachloride vapour is recycled into the chlorinating reactor, where it is reacted with fresh alumina.

According to the invention the silicon tetrachloride chlorinating agent and unreacted alumina are kept in a cycle until practically the total amount of alumina is converted into aluminium trichloride and the total amount of silicon tetrachloride is transformed into silicon dioxide.

Aluminium trichloride isolated by condensation as described above if desired, can be subjected to further purification in a manner known per se.

The reaction product is pure, anhydrous alumina, which may be converted into aluminium metal in a conventional manner and the chlorine evolved can excellently be utilized for chlorinating aluminium- and silicate-containing mineral materials in a process already referred to hereinabove. As a result of this process silicon tetrachloride is also obtained.

To sum it up, according to the invention silicon tetrachloride obtained as a by-product of the chlorination of aluminium- and silicon-containing minerals or in any other way can be utilized for converting the alumina content of an alumina concentrate into aluminium trichloride without using any further chlorinating agent. According to this process silicon tetrachloride is reacted with an alumina concentrate poor in iron at a temperature exceeding 400° C., preferably between 700° C. and 1200° C., unreacted silicon tetrachloride is separated from the aluminium trichloride formed and is recycled into the chlorination step, from the solid residue having a reduced alumina content and enriched in silicon dioxide the latter compound is isolated, the residual alumina is recycled into the chlorination step and the produced aluminium trichloride is continuously eliminated and if desired, subjected to further purification.

According to a preferred embodiment of the invention as an alumina concentrate alum earth prepared by an alkaline or acidic procedure is employed. According to another preferred embodiment silicon tetrachloride is introduced into the chlorination step by a carrier gas, e.g. nitrogen or carbon monoxide.

Further details of the invention are illustrated by the following Examples, which are not intended to limit the scope of the invention in any way.

EXAMPLE 1

Chlorination of bauxite and decomposition of silicon tetrachloride

Low grade bauxite (M<4) having a moisture content of 15.6% is calcined in a continuously operated fluid-bed furnace, in an air stream, at 680° C. to eliminate physically bounded water. Bauxite input: 11.85 kg./h., calcined bauxite output: 10 kg/h.

Composition of the calcined bauxite: 55.5% of $Al_2O_3$, 17.6% of $Fe_2O_3$, 21.8% of $SiO_2$, 5.1% of other ingredients.

Calcined bauxite is directly introduced into a fluid-bed chlorinating reactor operated at a temperature of 850° C. and its $Al_2O_3$ content is converted into $AlCl_3$ by a $Cl_2$/CO mixture ($Cl_2$ input: 45.7 kg./h., CO input: 6.1 kg./h.), with a conversion of 80%. In the same time 100% of $Fe_2O_3$ and 40% of $SiO_2$ present in the bauxite is converted into $FeCl_3$ and $SiCl_4$, respectively.

In this way 11.59 kg. of $AlCl_3$, 3.56 kg. of $FeCl_3$ and 2.46 kg. of $SiCl_4$ are obtained in an hour, while the unreacted starting material amounts to 2.93 kg./h.

After a selective condensation of the formed $AlCl_3$ and $FeCl_3$ in suitable condensers the product is further manufactured while the $SiCl_4$-containing gas mixture leaving the condensers is condensed at a temperature of 0° to 5° C. The liquid product obtained in then subjected to decomposition.

The decomposition of silicon tetrachloride is carried out in a fluid-bed reactor, using an alum earth containing 99.5% of $Al_2O_3$ obtained by the Bayer procedure as a reactant. Alum earth is introduced at the top of the reactor (input: 0.985 kg./h. and the fluid state is ensured by 2.46 kg/h. of $SiCl_4$ supplied into the reactor by means of nitrogen as carrier. The temperature of fluid bed is 800° C.

As a result of the reaction between silicon tetrachloride and alumina about 45% the initial amount of silicon tetrachloride is converted into silicon dioxide.

Aluminium trichloride formed and the unreacted silicon tetrachloride are eliminated from the system by means of the gas stream, while solid silicon dioxide and unreacted alum earth are discharged by overflow. In this way 1.11 kg. of silicon tetrachloride are decomposed in an hour and 1.16 kg./h. of aluminium trichloride are formed. Aluminium trichloride (1.16 kg.h.) and silicon tetrachloride (1.35 kg./h.) are condensed and added to the chlorides obtained in the chlorination step whereupon these components are further manufactured together. The alumina/silicon dioxide mixture eliminated by overflow (0.93 kg./h.) is treated with sulfuric acid, in a reactor equipped with a stirrer to yield $Al_2(SO_4)_3$. By decomposition of $Al_2(SO_4)_3$ obtained 0.5 kg./h. of alumina is obtained, which is then recycled to the chlorination step. The $SO_3$ vapour evolved during decomposition is added to the reactor equipped with a stirrer and is used for the preparation of $Al_2(SO_4)_3$.

EXAMPLE 2

Continuous decomposition of silicon tetrachloride

By carrying out the chlorination of a low-grade bauxite as described in Example 1 2.46 kg./h. of silicon tetrachloride are obtained. The product is condensed and stored as a liquid.

From a cooled tank used for storage silicon tetrachloride is led into an evaporator of 60° C., in which it is evaporated at a rate of 1.8 kg./h. and is subsequently introduced into a system consisting of two reactors connected in series. Into the reactors an alumina concentrated prepared by a hydrometallurgical treatment of high-quality bauxites ($Al_2O_3$ content exceeds 98%) is fed and silicon tetrachloride vapour is passed through the layers of this material. The first reactor contains 3 kg. of $Al_2O_3$ and has a temperature of 900° C. 1.8 kg./h. of silicon tetrachloride obtained by evaporation and 0.6 kg./h. of unreacted silicon dioxide discharged from the second reactor, i.e. altogether 2.4 kg./h. of silicon tetrachloride are passed through the $Al_2O_3$ charge of the first reactor. In this step 50% of the silicon tetrachloride is converted into silicon dioxide and 1.25 kg. of aluminium trichloride are formed. Chloride vapour leaving the first reactor is passed through a condenser, in which aluminium trichloride is condensed at a temperature of about 180° C. Unreacted silicon tetrachloride (1.2 kg./h.) is then introduced into the second reactor, which contains 1.5 kg. of the alumina concentrate and has a temperature of 900° C. About 50% of the silicon tetrachloride passed through this bed is converted into silicon dioxide and 0.6 kg./h. of silicon tetrachloride and 0.63 kg./h. of aluminium trichloride are discharged from the reactor. The aluminium trichloride obtained in this step is combined with the aluminium trichloride obtained in the preceding step. Unreacted silicon tetrachloride is recycled into the first reactor. In this way silicon tetrachloride is kept in a closed cycle.

To supplement the consumed alumina concentrate 1 kg./h. and 0.5 kg./h. alumina are additionally added to the first and second reactor, respectively. Silicon dioxide is eliminated at the bottom of the reactor. Silicon dioxide output: 0.5 kg./h. and 0.25 kg./h., respectively.

EXAMPLE 3

Reaction of silicon tetrachloride with aluminium oxide in an continuous counter-stream Silicon tetrachloride formed as a result of chlorination of bauxites is introduced into a bubble-plate reactor and nitrogen is bubbled through the liquid. The nitrogen stream is adjusted to evaporate 3 kg. of silicon tetrachloride per hour. The silicon tetrachloride/nitrogen stream is introduced into the first member of a five-member reactor system. The temperature of the reactors is 1000°, 1050°, 1100°, 1150° and 1200° C. respectively. Alumina concentrate is fed into the 2nd to 5th reactors separately. The alumina concentrate contains 99.0% of $Al_2O_3$ and is led in counter-flow related to the $N_2$/silicon tetrachloride mixture. As a result, the $N_2$/silicon tetrachloride mixture is enriched in aluminium trichloride and its silicon tetrachloride content is continuously decreasing. The solid phase ($Al_2O_3/SiO_2$) is separated from the gas phase ($N_2/SiCl_4/AlCl_3$) in heated cyclons inserted between the members of the reactor system. The silicon tetrachloride conversion in the subsequent reactors is as follows:

1st reactor: 40%
2nd reactor: 43%
3rd reactor: 48%
4th reactor: 52%
5th reactor: 55%.

Alumina concentrate is added into the 2nd, 3rd, 4th and 5th reactor in four equal portions. By this arrangement the total amount of $Al_2O_3$ is converted into aluminium trichloride, while the silicon tetrachloride conversion amounts to 96.3%.

In this system 3.15 kg./h. of aluminium trichloride and 0.95 kg./h. of silicon dioxide is formed. Aluminium trichloride may be separated from the $N_2/SiCl_4$ system separately, and can be further manufactured in a manner known per se.

By the process illustrated by this example about 96% of chloride used for the preparation of silicon tetrachloride can be recovered.

The high-purity silicon dioxide obtained by the decomposition of silicon tetrachloride can be used for numerous practical purposes.

The most important advantages of the process according to the invention are as follows:

(1) The production of aluminium trichloride by chlorination of aluminium silicate-containing mineral materials is rendered more economic, since both the silicon tetrachloride by-product and the high-purity silicon dioxide obtained can be advantageously utilized.

(2) Pure, anhydrous aluminium trichloride can economically be prepared by means of silicon tetrachloride, which was considered as a source of chlorine loss in the technologies known before.

(3) The aluminium trichloride obtained can easily be decomposed into aluminium and chlorine and the chlorine can be recycled into the chlorination step, i.e. chlorine is recovered in an amount corresponding to the chlorine present in silicon tetrachloride. In this way the loss in chlorine during the chlorination of minerals can considerably be reduced.

What we claim is:

1. Process for the preparation of aluminium trichloride and silicon dioxide by chlorination of an alumina containing material with silicon tetrachloride consisting essentially of reacting alumina or a material essentially consisting of alumina with silicon tetrachloride as a single chlorinating agent at a temperature exceeding 400° C., separating unreacted silicon tetrachloride from the aluminium trichloride obtained and recycling same into the chlorination step, isolating silicon dioxide from the solid residue essentially consisting of the unreacted alumina and silicon dioxide, by dissolving alumina and separating silicon dioxide by filtration, converting the dissolved alumina into alumina and recycling the so converted alumina into the chlorination step while continuously removing the aluminium trichloride obtained.

2. A process as claimed in claim 1, which comprises carrying out the chlorination at a temperature between 700° C. and 1200° C.

3. A process as claimed in claim 1, which comprises introducing silicon tetrachloride into the reaction system by means of a carrier gas.

4. A process as claimed in claim 3 in which nitrogen-/or carbon monoxide is used as a carrier gas.

5. A process as claimed in claim 1, which comprises separating aluminium trichloride from the gas mixture containing silicon tetrachloride and aluminium trichloride by condensation.

6. A process as claimed in claim 1, which comprises converting the alumina content of the chlorination residue essentially consisting of alumina and silicon dioxide into aluminium sulfate, by treatment with sulfuric acid, separating the aluminium sulfate obtained from the silicon dioxide by dissolving in water, subjecting aluminium sulfate to pyrolytic decomposition and recycling the alumina obtained into the chlorination step.

* * * * *